United States Patent

Hughes

(10) Patent No.: US 7,941,270 B2
(45) Date of Patent: May 10, 2011

(54) NAVIGATION SYSTEM

(75) Inventor: Ian Hughes, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 1120 days.

(21) Appl. No.: 10/559,586

(22) PCT Filed: May 28, 2004

(86) PCT No.: PCT/EP2004/050907
§ 371 (c)(1),
(2), (4) Date: Dec. 2, 2005

(87) PCT Pub. No.: WO2005/001390
PCT Pub. Date: Jan. 6, 2005

(65) Prior Publication Data
US 2007/0093955 A1   Apr. 26, 2007

(30) Foreign Application Priority Data
Jun. 25, 2003  (GB) .................................. 0314770.9

(51) Int. Cl.
*G01C 21/34* (2006.01)
(52) U.S. Cl. .... 701/211; 701/201; 701/206; 340/995.27
(58) Field of Classification Search ............... 701/211, 701/206, 208, 209; 340/995.24, 989, 990, 340/991, 993, 995.12, 995.15, 995.16, 996; 455/456.2, 456.3, 456.5, 456.6, 457; 342/357.06, 342/357.09, 357.13
See application file for complete search history.

(56) References Cited

U.S. PATENT DOCUMENTS

| 5,612,882 | A  | * | 3/1997 | LeFebvre et al. | 701/209 |
| 5,845,228 | A  | * | 12/1998 | Uekawa et al. | 701/209 |
| 6,055,478 | A  | * | 4/2000 | Heron | 701/213 |
| 6,199,014 | B1 | * | 3/2001 | Walker et al. | 701/211 |
| 6,314,367 | B1 | * | 11/2001 | Ohler et al. | 701/208 |
| 6,539,080 | B1 | * | 3/2003 | Bruce et al. | 379/88.17 |
| 6,604,045 | B2 | * | 8/2003 | Kuroda et al. | 701/202 |

(Continued)

FOREIGN PATENT DOCUMENTS

EP  0 790 486  8/1997

(Continued)

OTHER PUBLICATIONS

Moscow Metro Map, WayToRussia.Net, Accessed on: Mar. 20, 2002.*

*Primary Examiner* — Khoi Tran
*Assistant Examiner* — Spencer Patton
(74) *Attorney, Agent, or Firm* — Schmeiser, Olsen & Watts; John Pivnichny (57) ABSTRACT

A method and system for providing navigational instructions. A signal is received from a first device. The signal specifies a destination location, a second device, and a request for at least one route leading to the destination location such that the at least one route is to be sent to the second device. During or after the signal is received from the first device, a device type of the second device is determined. At least one set of images is sent to the second device. Each set of images defines a unique route leading to the destination location. A total number of the sets of images and a content of each set of images are a function of the determined device type.

18 Claims, 5 Drawing Sheets

U.S. PATENT DOCUMENTS

| | | | |
|---|---|---|---|
| 6,621,423 B1 * | 9/2003 | Cooper et al. | 340/995.24 |
| 6,714,794 B1 * | 3/2004 | O'Carroll | 455/466 |
| 6,904,359 B2 * | 6/2005 | Jones | 701/204 |

FOREIGN PATENT DOCUMENTS

| | | |
|---|---|---|
| EP | 1 106 965 | 6/2001 |
| EP | 1106965 A1 * | 6/2001 |
| EP | 1300655 A2 * | 4/2003 |
| JP | 09-218047 | 8/1997 |
| JP | 10-232135 | 9/1998 |
| JP | 10232135 | 9/1998 |
| WO | WO 02/063243 | 8/2002 |

* cited by examiner

NAVIGATION SYSTEM

TECHNICAL FIELD

This invention relates to the field of navigation systems. In particular, this invention relates to personal navigation using a mobile device.

BACKGROUND ART

Personal navigation methods have evolved over recent years. Previously, if a person was trying to find a location in an area in they did not know, they could use a map, if there was one available, or they could ask someone for directions. When giving directions, people often refer to obvious landmarks to help to describe the route and to help the person finding their way to recognise if they are on the right track.

Electronic navigation systems have developed using reference to the Global Positioning System (GPS) of coordinates. Global Positioning System (GPS) is a satellite-based system providing worldwide continuous position data. It has a widespread use in navigation systems as it provides very accurate location data in the form of longitude and latitude for a receiver. Known personal navigation systems are based on GPS correlating the latitude and longitude with road maps in order to help a user to navigate in an unknown location.

The data a user receives from known navigation systems is usually in the form of maps or plan views. The maps can be very precise or simplified schematic maps.

Known forms of navigation systems have been provided in a dedicated device, often including a GPS receiver. For example, navigation systems for vehicles are known in which a device with a screen is attachable to the dashboard and maps of the location of the vehicle are displayed on the screen. Route planners can show a route between two locations on the map allowing the operator to follow the route. Additional traffic information can also be provided showing areas to be avoided due to congestion.

With the development of mobile technology in the form of laptop computers, Personal Digital Assistants (PDAs) and mobile (or cell) telephones, individuals often habitually carry an electronic device on their person. Additional numbers of individuals habitually have an electronic device in their vehicle. The term mobile electronic device is used to include any form of electronic device which can be carried in a car or on a person outside an office or home environment.

Many mobile electronic devices have a network connection facility for receiving and sending data. More recently there has been an increase in multimedia applications available on mobile devices.

A recent development in mobile telephone technology is multimedia messaging service (MMS) in which the short messaging service (SMS) has been extended to allow messages to be sent between mobile telephones and from telephone to email and vice versa incorporating sound, images and other rich content. The MMS message is a multimedia presentation in a single entry, not a text file with attachments, making it simple and user friendly. The MMS standard lists JPEG, GIF, text, AMR voice and other formats as supported media types. MMS is an open industry standard and messages can be delivered using existing networks and protocols.

The speed of MMS transmission is dependent on the message size and on the bearer being used. However, since the receiver is not aware of the ongoing transmission before the message has been delivered, any delay is not noticeable. If a telephone is switched off, has an empty battery or poor network coverage, a network element, the multimedia messaging service centre (MMSC) stores undelivered MMS messages until the receiving telephone can be reached.

Mobile telephone technology has also developed in that the volume of data that can be transmitted has increased Third generation (3G) mobile telephones will provide a large increase in volume capacity as they move from circuit-switched communications to wireless broadband, high-speed, packet-based networks. Until such 3G telephones are available and their use widespread, there are volume restrictions on the amount of data which can be sent to a telephone.

Mobile telephones are also becoming widespread with built in digital cameras enabling individuals to take photographs using their mobile telephones and send the photographs via the MMS service to other enabled telephones or to an email address.

DISCLOSURE OF INVENTION

The aim of the present invention is to provide a navigation service available on a mobile electronic device and provides directions in a user friendly form.

According to a first aspect of the present invention there is provided a navigation system comprising: a mobile device having a data receiving means capable of receiving images and an image display means; a server having a store of a plurality of images, each image representing a location and more than one image being compilable to define a route between locations; the server having means for receiving a request and means for sending a series of images to the receiving means of the mobile device.

The store of images may include more than one predefined route made up of a series of images, wherein a series of images defines a route to a destination location or a circular route. The server may have a route finding mechanism for compiling a series of images to define the route.

The store of the plurality of images may be keyed on the location of an image or one location of a series of images and a request specifies a location, wherein the server may also include a search mechanism to search for a requested location.

Each image may be a photograph, diagram or picture representing a location. Series of images may be provided in categories depending on a mode of transport of a user, the type of location represented in the images and the distance between the locations represented in the images of the series.

In one embodiment, a series of images is sent as a single packet to the mobile device. In an alternative embodiment, a series of images is sent piecemeal in more than one portion to the mobile device in response to a prompt from the mobile device for the next portion of the series.

The means for receiving the request may recognise the type of device making the request and may send the series of images in a form suitable for the type of device.

Preferably, the mobile device is a mobile telephone enabled with MMS messaging and the series of images is sent as an MMS message to the mobile telephone.

The mobile device may include a camera and an image of a location may be sent from the mobile device to the server. The server may include means for receiving an image and adding the image to the store of images.

The server may include a voting mechanism in which a user can vote on the usefulness of an image and the server adapts the store of images in response to votes received.

According to a second aspect of the present invention there is provided a method of supplying navigation information comprising: obtaining and storing a plurality of images, each image representing a location and more than one image being compilable to define a route between locations; receiving a request for navigation information; searching through the plurality of images to obtain a series of images in accordance with the request; sending a series of images to a mobile device.

The method may include storing more than one predefined route made up of a series of images, wherein a series of images defines a route to a destination location or a circular route. The method may include compiling a series of images to define the route in response to a request.

The method may include keying the plurality of images on the location of an image or one location of a series of images and the step of searching is carried out by location.

The method may include storing series of images in categories depending on a mode of transport of a user, the type of location represented in the images and the distance between the locations represented in the images.

In one embodiment, the step of sending a series of images sends the images as a single packet. In an alternative embodiment, the step of sending a series of images may send the images piecemeal in more than one portion in response to received prompts for the next portion of the series of images.

The method may include recognising the type of device sending a request and sending a series of images in a format to suit the type of device.

The method may include receiving a new image and adding the image to a series of images.

The method may include receiving and processing votes on the usefulness of an image and amending the store of images in accordance with the votes received.

According to a third aspect of the present invention there is provided a computer program product stored on a computer readable storage medium, comprising computer readable program code means for performing the steps of: obtaining and storing a plurality of images, each image representing a location and more than one image being compilable to define a route between locations; receiving a request for navigation information; searching through the plurality of images to obtain a series of images in accordance with the request; sending a series of images to a mobile device.

BRIEF DESCRIPTION OF THE DRAWINGS

Embodiments of the present invention will now be described, by way of examples only, with reference to the accompanying drawings in which.

MODE FOR THE INVENTION

Figure 1:
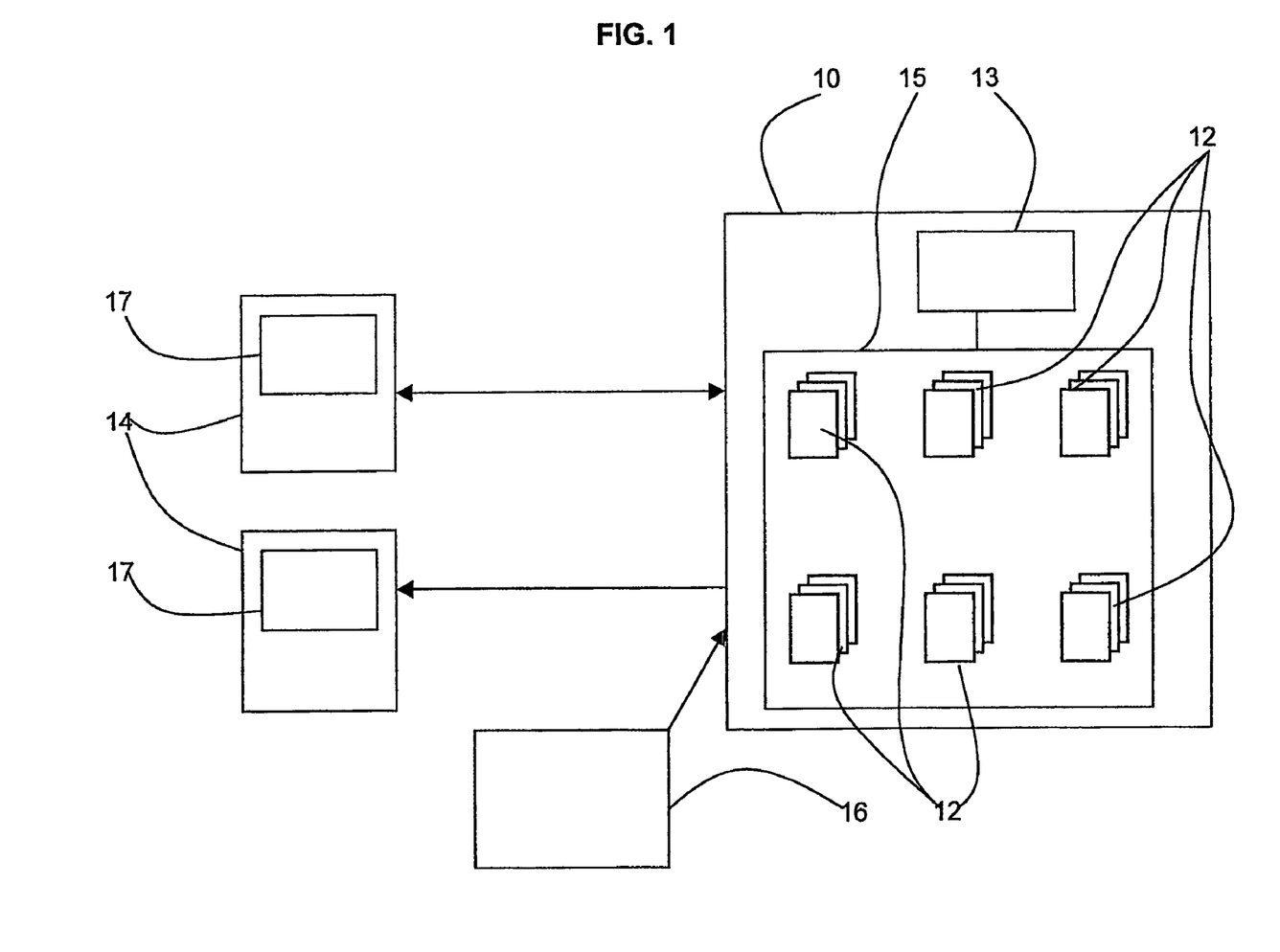
FIG. 1 is a schematic diagram of the apparatus of a navigation system in accordance with the present invention.

Referring to FIG. 1, a navigation system is provided in which a multi-media service centre 10 has a server with a database in the form of an image library 15 which stores navigation information in the form of images 12 of locations.

The service centre 10 also has a search and route finding mechanism 13 which operates to locate and sort images 12 held in the image library 15 and to compile routes formed of series of images 12.

Requests to the service centre 10 for images 12 are made via a communication network. A request may be made from a mobile device 14 which is to receive the images 12 or, alternatively, the request may be made from another requesting device 16 specifying a mobile device 14 to which the information is to be sent. The requesting device 16 may be mobile or fixed, for example a desktop computer with Internet access.

A mobile device 14 has a receiving means for receiving images 12 from the service centre 10 via the communication network and a display means 17 capable of displaying images.

When a request is made to the service centre 10, a set of images 12 is collected by the search and route finding mechanism 13 and sent to the mobile device 14. The set of images 12 may be a predefined series of images defining a route or may be multiple images compiled by the route finding mechanism in reply to the request The images 12 and any predefined series of images are stored in the images library 15 and are keyed by the location represented in the image, by a destination location for a route, or other distinguishing means to enable a search to locate relevant images 12 in response to a request.

A predefined series of images can be keyed by its destination location with further identifiers for starting locations of different routes to the same destination location. A series of images may also be keyed by the area, for example the town or city in which the route is, or by any other identifying feature.

A search mechanism 13 is provided for searching the images library 15 when a route request is received at the service centre 10. The request may identify the destination location and possibly also a starting point, or may request all circular routes in a particular town. If multiple series of images 12 are found by the search mechanism 13 in response to a request, a list of possible routes may be provided to the user for selection.

Figure 2A:
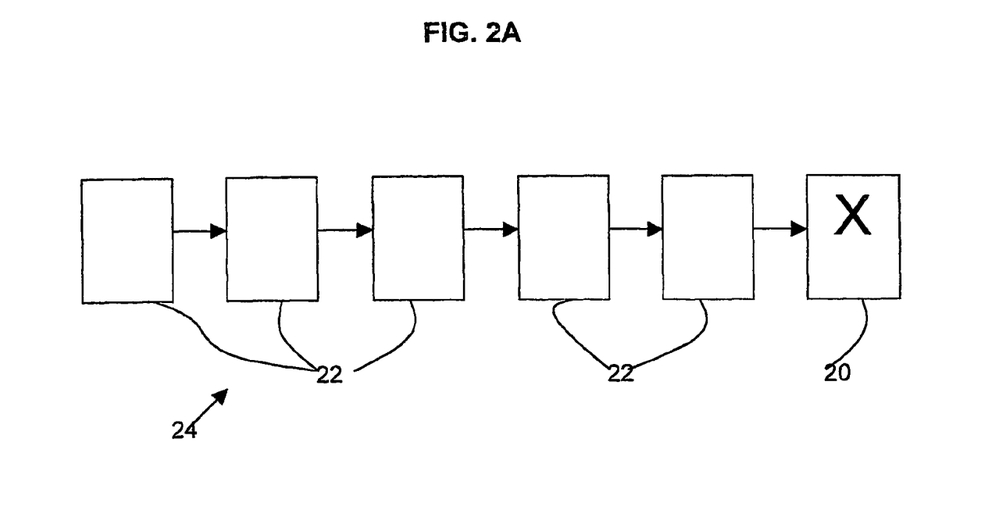
FIGS. 2A, 2B and 2C are diagrams of linear and a non-linear series of images as used in a navigation system in accordance with the present invention.
Figure 2B:
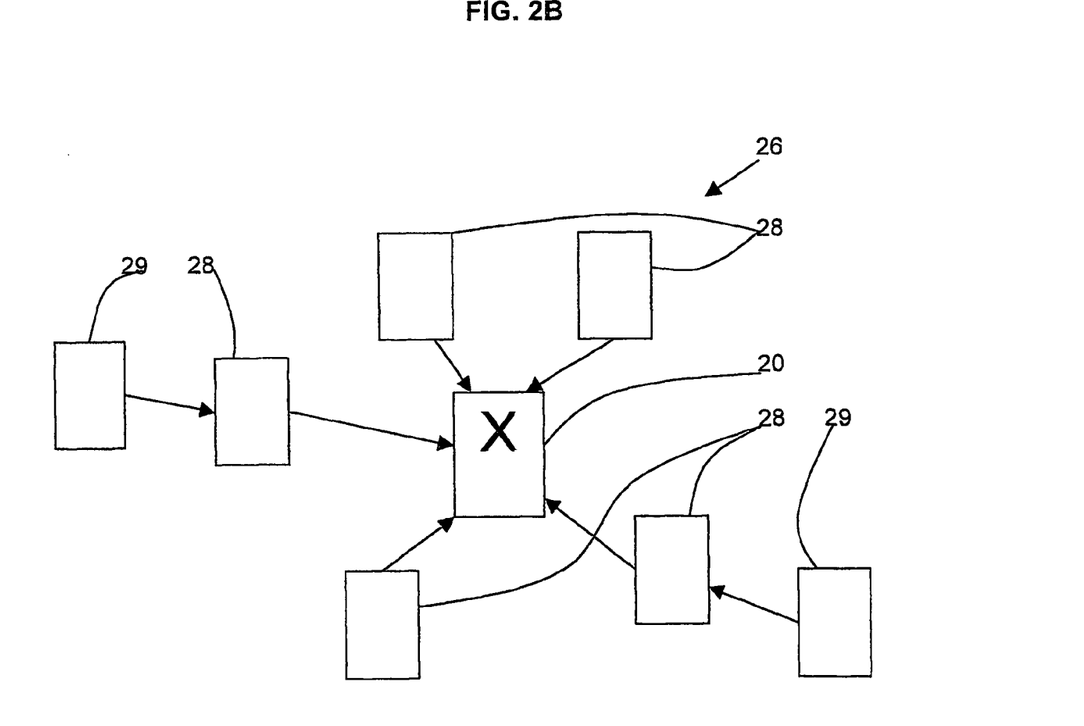
Figure 2C:
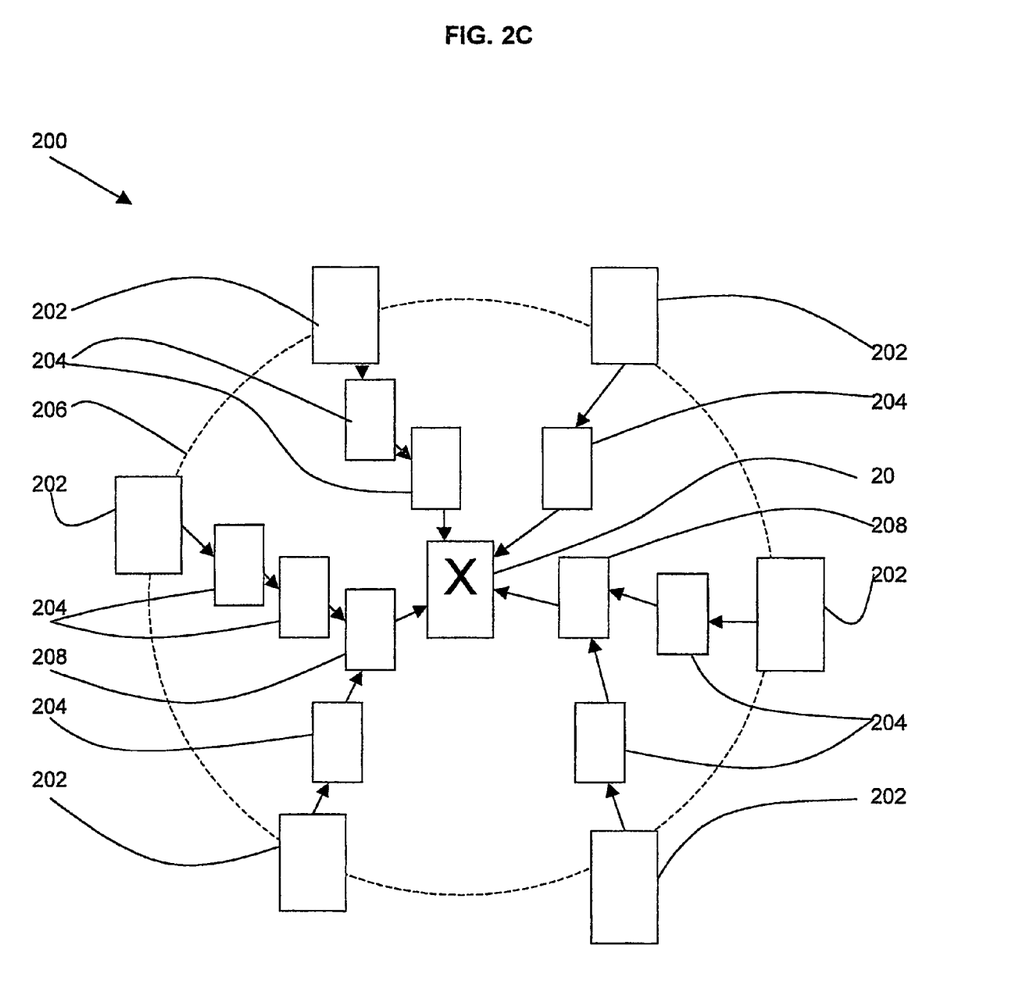

Referring to FIGS. 2A, 2B and 2C, example predefined series of images are shown. Each series of images 24, 26, 200 has a destination image 20 which is a representation of a destination location. Each of images in the series of images shows a representation of a location en route to the destination location.

In FIG. 2A, a linear series 24 is shown in which each image 22 is of a location which is sequentially closer to the destination location. The route can be picked up by a user at any image 22 he recognises and continued to the destination location.

FIG. 2B shows a non-linear series 26 in which there is a destination image 20 with a plurality of images 28 of proximal locations which are close to the destination location. Further images 29 are provided on branches leading to the images 28 of the proximal locations.

FIG. 2C shows a further non-linear series 200 in which a destination image 20 has a circle 206 of surrounding images 202. Each surrounding image 202 has a route to the destination image 20 using intermediate images 204. Some of the intermediate images 208 on the final approach to the destination image 20 are used by more than one different route. There may also be provided routes between locations of images other than the destination image, for example between images on the circle 206.

Although destination locations are referred to in each of the above examples of series, the predefined routes could be used to provide a circular route, for example for tourists, taking in landmarks on the way. In this case, a user would request a circular route in a particular area or including a particular landmark.

It will be appreciated that any form of relationship between locations can be used and each series is referenced by a destination location, a start location, a route or other means.

Figure 3:
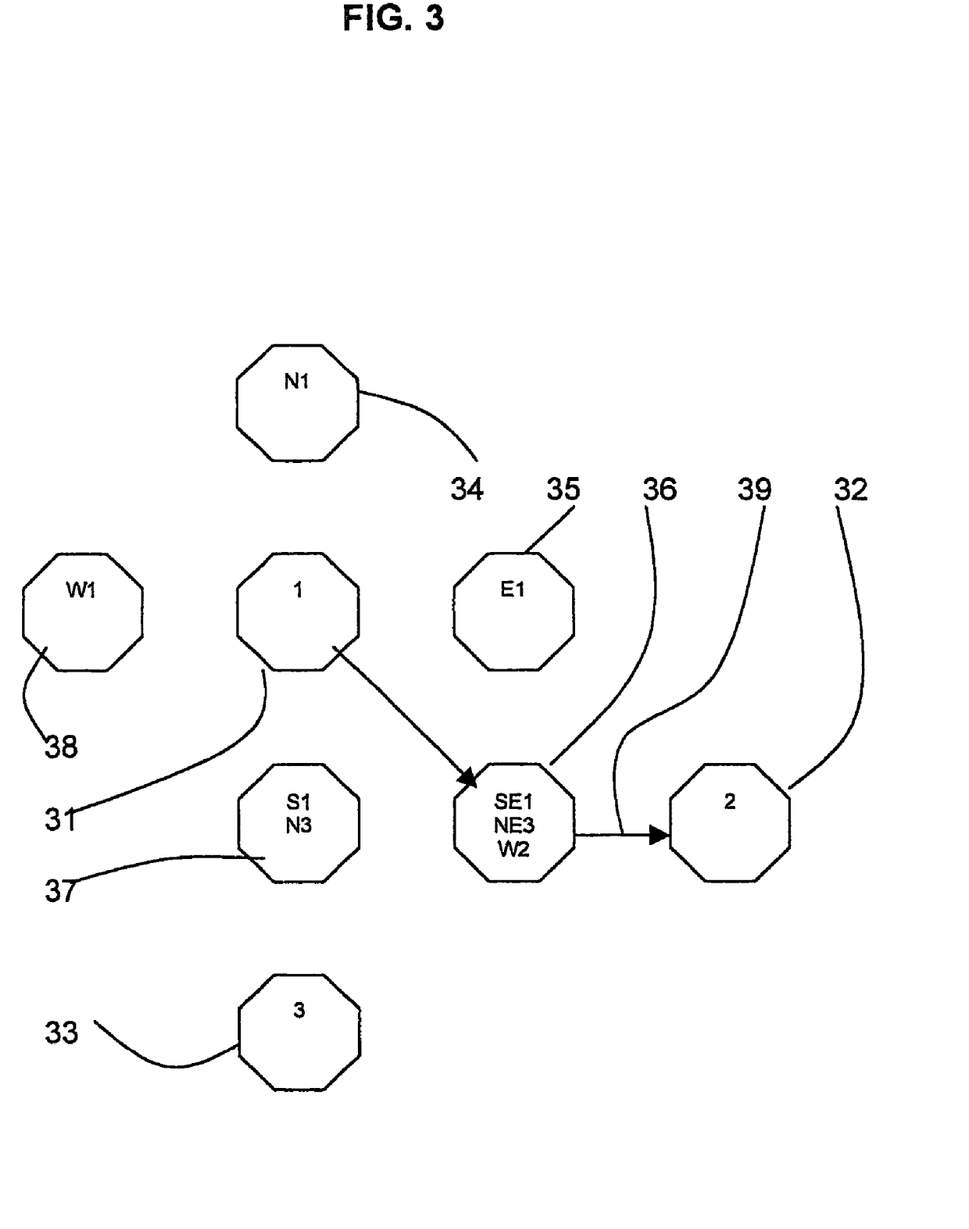
FIG. 3 is a diagram of a set of images as used in the navigation system in accordance with the present invention.

Referring to FIG. 3, images 12 could be stored using relative indicators showing the positional relationships between the images 12. Compass points could be used to indicate if a location is north, south, east or west of another location. Each image has a set of neighbours associated with it. This allows routes to be plotted by the route finder mechanism by stepping from each point to the next point via stored images. New routes can be built up from existing relationships and gaps can be filled in and replaced as new routes are taken.

In FIG. 3, a first location 1 is represented by image 31, a second location 2 by image 32 and a third location 3 by image 33. Images are provided of points around these locations which are identified by the compass direction from a location. For example, the first location 1 has five images 34, 35, 36, 37, 38 surrounding it referred to as N1 north of location 1, E1 east of location 1, SE1 south-east of location 1, S1 south of location 1 and W1 west of location 1. The image 36 south-east of location 1 is also west of location 2 and so also has reference W2 and north-east of location 3 and so also has reference NE3.

A route 39 can be planned from location 1 to location 2 by making a series of images 31, 36 and 32 going from location 1 to SE1 to location 2.

A complete grid reference application could be provided with the collection of images done with high end GPS devices and the delivery of the routing done with low end MMS devices. As it will be appreciated, there are many different ways of handling the routing and storage of the images.

The images can be photographs, pictures (for example, where a photograph is not yet available), schematic diagrams (for example, for a train or bus station where a sign can be used) or any other form of representation of a location. The images are stored in a suitable format for transmission to different forms of mobile devices 14.

A user of a mobile device can receive a series of images from the service centre for a destination location that the user wishes to find. The images are not referenced to a map but can be used independently as a form of landmark navigation system. A user identifies a landmark where they are and relates it to one of the images in the series and then looks for the next landmark by reference to the next image in a series. By following the images of the landmarks a user can navigate to the destination location.

Although reference is made to series or sets of images, a single image could be provided to show the user what a location looks like. The image could be a photographic view of an area, a road junction, street, landmark, etc.

The mobile device is any form of electronic device with a display screen capable of displaying images which can be carried on a person or in a vehicle. The mobile device must be capable of receiving images for display. For example, the mobile device may be a laptop computer, a PDA, a mobile telephone, etc.

The mobile device has a communication network connection in order to receive the images. The images can be sent as a complete series or piecemeal. If sent piecemeal, one or more images may be sent at a time automatically or in response to prompts from the user. The mobile device does not require a permanent connection to a communication network. The mobile device may be on-line during operation of the navigation system or may receive all the information in advance and operate the system off-line.

In an example embodiment of the present invention, the mobile device is a mobile telephone with MMS capability. The user of the mobile telephone is at a first location in a town and the user wishes to find a destination location. The user sends a message, which may be, for example, a text message using the SMS protocol, to a service centre. The message identifies the destination location by giving the name, the address or the postcode of the destination location. The message may also give the user's current location as a start point. The user may be given a list of possible routes to choose from in the form of a return SMS message. If the start point is not recognised by the service centre, the user may be given a list of all possible routes to the destination location to choose from and the user can pick up the route from any image he recognises.

A message can also be sent by a separate requesting device and not from the mobile device itself. A user can send a message from his desktop computer in advance when planning a trip and ask for the series of images for a desired location to be sent to his mobile telephone.

A series of images to the destination location are sent to the mobile telephone as an MMS message with the series of images in one of the recognised standards such as JPEG.

As one option, a series of images is sent as a single message and stored on the mobile telephone. This has an advantage that the user can enter an area of poor signal reception and the entire route is already stored on his mobile device.

As an alternative option, the user carries out a dialogue with the service provider and obtains the series of images in piecemeal form with one or more images at a time. This enables the user to reach a location before receiving the image of the next location which is preferable if the mobile telephone being used has limited capacity for storing the images.

The next or previous images in the series can be called up to be displayed by using existing device interfaces such as the browser forward and back buttons on the mobile device.

The service centre recognises the type of mobile device which is requesting the information and the information is provided in a form and resolution suitable for that device. For example, if the series of images is to be sent to a mobile telephone, the number of images and the resolution will be reduced to enable the mobile telephone to receive the information. A message of 50 kB will enable five photographs of sufficient resolution to be received. If the capacity of the mobile device is higher more detailed series of images with associated text, video clips and audio could be sent. Each series of images has core images which are given priority to be sent with additional intermediate images which can be sent if more capacity is available.

An additional feature of the navigation system is that users can contribute to the system. Users can be interactive with the system by voting on which images were the most useful. If an image is found to be consistently voted as not being useful the system evolves over time by reviewing the votes received and removing the least useful images.

In addition, users can contribute to the system by providing images of landmarks which they consider to be useful on a route or which replace existing images. The database of locations is then built up by the users of the system.

Mobile telephones that incorporate a digital camera can be used to enable users to send a digital photograph of a landmark location to the service. In this way the database of routes and images grows as it is used and evolves to become more effective.

If there is no existing series of images for a destination location that is requested the route finding mechanism of the service provider can build the series on demand.

The images can be provided in different categories dependent on the mode of transport being used by the user. The mode of transport can be specified in the initial requesting message and the correct category of images will be sent. If a user is on foot, the landmarks they will see and the distance between sequential landmarks will be different to the landmarks and distances if the user is in a vehicle. The route taken by a vehicle may also be different as there may be one-way systems or pedestrian routes to accommodate.

Figure 4:
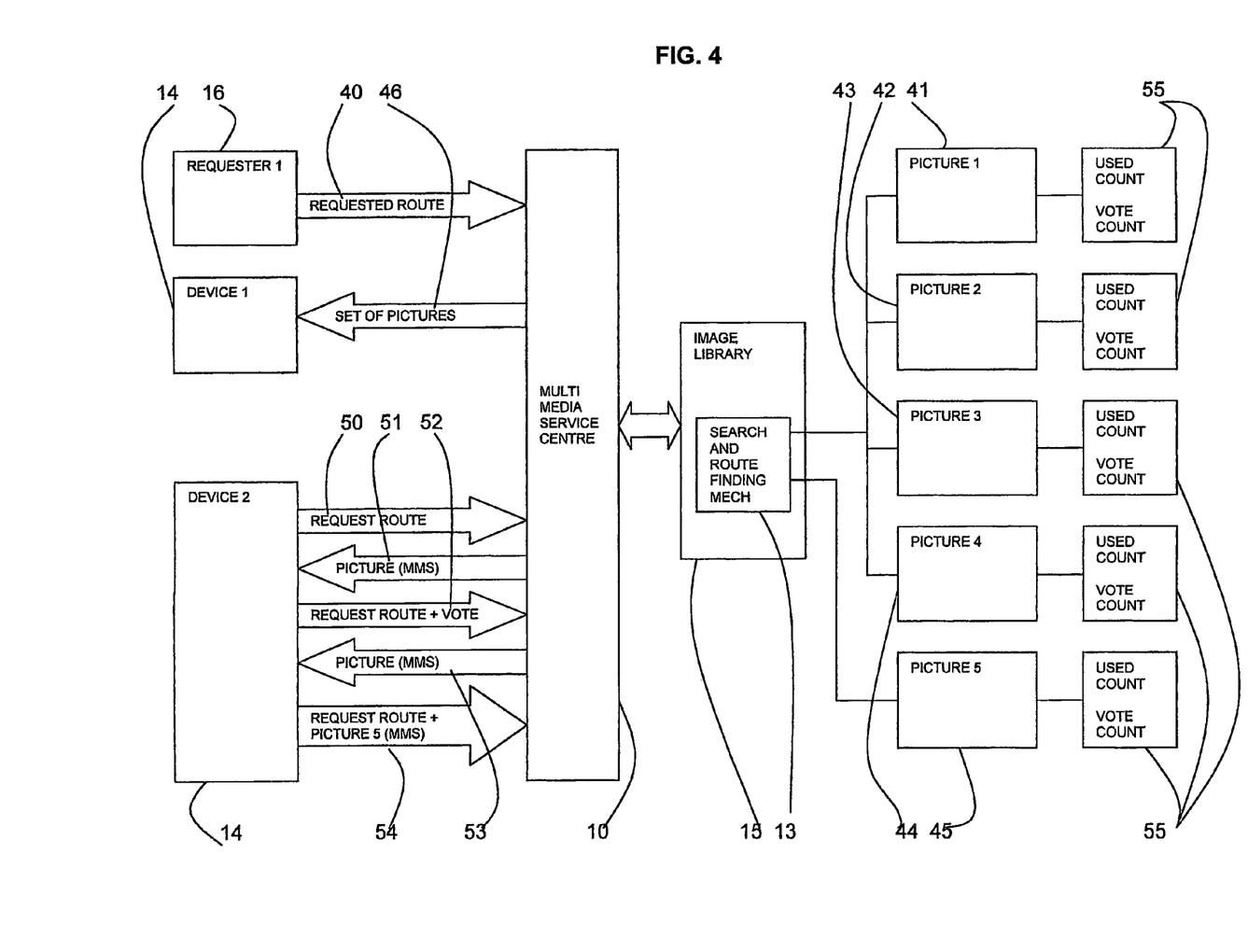
FIG. 4 is a block diagram showing interactions in a navigation system in accordance with the present invention.

Referring to FIG. 4, a first scenario is shown in which a requesting device 16 sends a route request 40 for a set of route images to be sent as a single batch to a mobile device 14 (device 1) specified by the requesting device 16.

The route request 40 is sent to the multi-media service centre 10 which processes the route request 40 by referring it to the image library 15 and route finding mechanism 13. A set 46 of four images 41, 42, 43, 44 is returned by the route finding mechanism 13 and the set of images 46 is sent to the mobile device 14 specified by the requesting device 16.

The mobile device 14 is only required to dock with the communication network connecting the mobile device 14 with the multi-media service centre 10 to receive the set of images 46. After receiving the set of images 46, the mobile device 14 no longer interacts with the service centre 10.

Still referring to FIG. 4, a second, more complex, scenario is shown in which a mobile device 14 (device 2) makes a route request 50 to the service centre 10. The route request 50 is referred to the image library 15 and route finding mechanism 13.

In this scenario, the images making up the set for the route request 50 are sent one at a time to the mobile device. The images could equally be sent two at a time or as any subset of the set of images.

A first image 41 is sent 51 to the mobile device 14 as an MMS message. The mobile device 14 then requests 52 either automatically or on a user next action the next image in the set. This request 52 also contains a vote to indicate how useful the first image 41 was.

Each image 41, 42, 43, 44, 45 stored by the image library 15 has a count mechanism 55 for counting each time the image is used and how many votes are received for the image's usefulness. The counting mechanism 55 is controlled by the service centre 10 which can replace, delete or amend an image depending on the number of uses and votes the image has received.

In response to the request 52 for the next image in the set, a second image 42 is sent 53 to the mobile device 14 as an MMS message. The mobile device 14 then requests 54 the next image in the set. This request 54 contains a new image 45 which the user of the mobile device 14 has provided updating the second image 42. The supply of a new image 45 is an implied vote with a better suggestion for the second image 42. The new image 45 is added to the image library 15.

EXAMPLE

The following is an example of a use of the navigation system.

A tourist is in London and wishes to go to Buckingham Palace. The tourist sends a text message from his mobile telephone to the service provider requesting a series of images to help him to find Buckingham Palace. He specifies that he is on foot and starting from Charring Cross underground station.

In one form, a linear series of images is provided.

1. The first image is of an underground sign for Charring Cross.

2. The second image is of Nelson's Column in the centre of Trafalgar Square. Charring Cross station has numerous exits and it is unimportant which of these the tourist takes as once he is above ground he will be able to make his way to Nelson's Column by sight.

3. The third image is of Admiralty Arch. Standing at Nelson's Column, the tourist can look around and see Admiralty Arch and recognise it from the photograph image received. If the tourist were to be in this position and try to read a map it is extremely difficult to work out which road is which but a simple landmark to recognise makes the navigation easy. The tourist makes his way to Admiralty Arch and finds he is standing at the end of The Mall.

4. The fourth image is looking down The Mall to indicate that this is the direction which should be taken.

5. The fifth image is St James' Palace on the right half way down The Mall.

6. The sixth image is The Queen Victoria Memorial and the forecourt of Buckingham Palace.

As an alternative form of series of images, a non-linear series as shown in FIG. 2C could be provided. A destination location is specified without a starting location. In the case of Buckingham Palace a ring of images of locations is provided of landmarks which are all within easy reach of Buckingham Palace. For example, this ring could include: Nelson's Column, Piccadilly Circus, Hyde Park Corner and Victoria Station all of which are very recognisable locations. Intermediate images between each of the locations of the ring and Buckingham Palace could then be provided. The tourist can scan though the images and pick up the route from any location he recognises.

This system has the advantage that it is a user-friendly landmark based navigation system. The navigation system provides a method in which the user does not need to read a map but simply relies on landmarks to navigate to a destination location. Having seen a location, it is often easier to navigate back to it. Navigation is achieved visually by pictures of key locations. The development of multi-media mobile telephones with MMS protocol enables photographs to be sent to and gathered from mobile telephones making the navigation system to be available to a wide audience. With the facility for contribution and voting, the system win evolve, expand and improve over time.

The images provided are of key locations that are eye-catching or are often frequented places in a surrounding area. Eye-catching details help users to navigate and general images show the user the appearance of the area they are looking for. The system could use details such as looking up at an overhead cable or looking down at a line on the ground such as the one painted around the town of Boston for tourists to follow.

The system can range from a low technology system using existing MMS technology to one that provides enhanced augmented reality solutions based on GPS data and other location based feeds. However, the simplicity and low cost in setting up this service and the ability for it to grow based on community usage is its attraction.

Improvements and modifications can be made to the foregoing without departing from the scope of the present invention.

The invention claimed is:

1. A method for providing navigational instructions, said method comprising:
    a service centre receiving a signal from a first device, said signal specifying a destination location, a receiving device selected from the group consisting of the first device and a second device, and a request for at least one route leading to the destination location such that the at least one route is to be sent to the receiving device; and in response to said receiving the signal from the first device, said service centre sending at least one set of images to the receiving device, wherein each set of images of the at least one set of images defines a unique route leading to the destination location, wherein the at least one set of images comprises a plurality of sets of images, wherein the signal specifies a starting location, wherein the service centre comprises a database that includes multiple locations and multiple sets of images leading to different destination locations, wherein the method further comprises said service centre determining that the database does not comprise the starting location specified in the signal, and wherein the unique routes defined by the sets of images of the plurality of sets of images consists of all possible unique routes to the destination location that are stored in the database.

2. The method of claim 1, wherein the receiving device specified in the signal is the first device.

3. The method of claim 1, wherein the receiving device specified in the signal is the second device.

4. The method of claim 1, wherein the database comprises the at least one set of images, and wherein the method further comprises:
   said service centre receiving a vote on a usefulness of each received image in the at least one set of images; and
   said service centre modifying the database in dependence upon said received votes, wherein said modifying comprises at least one of replacing, deleting, and amending at least one image in the at least one set of images in the database.

5. The method of claim 1, wherein said sending the at least one set of images to the receiving device comprises sending the first set of images to the receiving device two images at a time.

6. A computer program product stored on a computer readable storage device, comprising computer readable program code for performing a method for providing navigational instructions, said method comprising:
   a service centre receiving a signal from a first device, said signal specifying a destination location, a receiving device selected from the group consisting of the first device and a second device, and a request for at least one route leading to the destination location such that the at least one route is to be sent to the receiving device; and
   in response to said receiving the signal from the first device, said service centre sending at least one set of images to the receiving device, wherein each set of images of the at least one set of images defines a unique route leading to the destination location, wherein the at least one set of images comprises a plurality of sets of images, wherein the signal specifies a starting location, wherein the service centre comprises a database that includes multiple locations and multiple sets of images leading to different destination locations, wherein the method further comprises said service centre determining that the database does not comprise the starting location specified in the signal, and wherein the unique routes defined by the sets of images of the plurality of sets of images consists of all possible unique routes to the destination location that are stored in the database.

7. The computer program product of claim 6, wherein the receiving device specified in the signal is the first device.

8. The computer program product of claim 6, wherein the receiving device specified in the signal is the second device.

9. The computer program product of claim 6, wherein the database comprises the at least one set of images, and wherein the method further comprises:
   said service centre receiving a vote on a usefulness of each received image in the at least one set of images; and
   said service centre modifying the database in dependence upon said received votes, wherein said modifying comprises at least one of replacing, deleting, and amending at least one image in the at least one set of images in the database.

10. The computer program product of claim 6, wherein said sending the at least one set of images to the receiving device comprises sending the first set of images to the receiving device two images at a time.

11. A system comprising a service centre, said service centre comprising a database for storing images of locations and a computer program product for performing a method for providing navigational instructions using images in the database, said method comprising
   a service centre receiving a signal from a first device, said signal specifying a destination location, a receiving device selected from the group consisting of the first device and a second device, and a request for at least one route leading to the destination location such that the at least one route is to be sent to the receiving device; and
   in response to said receiving the signal from the first device, said service centre sending at least one set of images to the receiving device, wherein each set of images of the at least one set of images defines a unique route leading to the destination location, wherein the at least one set of images comprises a plurality of sets of images, wherein the signal specifies a starting location, wherein the service centre comprises a database that includes multiple locations and multiple sets of images leading to different destination locations, wherein the method further comprises said service centre determining that the database does not comprise the starting location specified in the signal, and wherein the unique routes defined by the sets of images of the plurality of sets of images consists of all possible unique routes to the destination location that are stored in the database.

12. The system of claim 11, wherein the receiving device specified in the signal is the first device.

13. The system of claim 11, wherein the receiving device specified in the signal is the second device.

14. The system of claim 11, where the database comprises the at least one set of images, and wherein the method further comprises:
   said service centre receiving a vote on a usefulness of each received image in the at least one set of images; and
   said service centre modifying the database in dependence upon said received votes, wherein said modifying comprises at least one of replacing, deleting, and amending at least one image in the at least one set of images in the database.

15. The system of claim 11, wherein said sending the at least one set of images to the receiving device comprises sending the first set of images to the receiving device two images at a time.

16. A method for providing navigational instructions, said method comprising:
   a service centre receiving a signal from a first device, said signal specifying a destination location, a receiving device selected from the group consisting of the first device and a second device, and a request for at least one route leading to the destination location such that the at least one route is to be sent to the receiving device; and
   in response to said receiving the signal from the first device, said service centre sending at least one set of images to the receiving device, wherein each set of images of the at least one set of images defines a unique route leading to the destination location, wherein the at least one set of images comprises a plurality of sets of images, wherein each set of images comprises a furthest image that is furthest from the destination location, wherein the furthest images of the plurality of sets of images collectively form on a ring of images surrounding the destination location, wherein the ring of images is shaped as a circle whose center is at the destination location, wherein the at least one set of images comprises a first set of images and a second set of images, wherein the unique route defined by the first set of images is a first unique route leading to the destination location from a first starting location on the circle, wherein the unique route defined by the second set of images is a second unique route leading to the destination location from a second starting location on the circle, wherein the first unique route comprises a first image at the first starting location on the circle, an inner image at an inner location inside the circle, and a destination image at the destination location, and wherein the second unique route comprises a second image at the second starting location on the circle, the inner image at the inner location inside the circle, and the destination image at the destination location.

17. A computer program product stored on a computer readable storage device, comprising computer readable program code for performing a method for providing navigational instructions, said method comprising:

a service centre receiving a signal from a first device, said signal specifying a destination location, a receiving device selected from the group consisting of the first device and a second device, and a request for at least one route leading to the destination location such that the at least one route is to be sent to the receiving device; and in response to said receiving the signal from the first device, said service centre sending at least one set of images to the receiving device, wherein each set of images of the at least one set of images defines a unique route leading to the destination location, wherein the at least one set of images comprises a plurality of sets of images, wherein each set of images comprises a furthest image that is furthest from the destination location, wherein the furthest images of the plurality of sets of images collectively form on a ring of images surrounding the destination location, and wherein the ring of images is shaped as a circle whose center is at the destination location, wherein the at least one set of images comprises a first set of images and a second set of images, wherein the unique route defined by the first set of images is a first unique route leading to the destination location from a first starting location on the circle, wherein the unique route defined by the second set of images is a second unique route leading to the destination location from a second starting location on the circle, wherein the first unique route comprises a first image at the first starting location on the circle, an inner image at an inner location inside the circle, and a destination image at the destination location, and wherein the second unique route comprises a second image at the second starting location on the circle, the inner image at the inner location inside the circle, and the destination image at the destination location.

18. A system comprising a service centre, said service centre comprising a database for storing images of locations and a computer program product for performing a method for providing navigational instructions using images in the database, said method comprising a service centre receiving a signal from a first device, said signal specifying a destination location, a receiving device selected from the group consisting of the first device and a second device, and a request for at least one route leading to the destination location such that the at least one route is to be sent to the receiving device; and in response to said receiving the signal from the first device, said service centre sending at least one set of images to the receiving device, wherein each set of images of the at least one set of images defines a unique route leading to the destination location, wherein the at least one set of images comprises a plurality of sets of images, wherein each set of images comprises a furthest image that is furthest from the destination location, wherein the furthest images of the plurality of sets of images collectively form on a ring of images surrounding the destination location, and wherein the ring of images is shaped as a circle whose center is at the destination location, wherein the at least one set of images comprises a first set of images and a second set of images, wherein the unique route defined by the first set of images is a first unique route leading to the destination location from a first starting location on the circle, wherein the unique route defined by the second set of images is a second unique route leading to the destination location from a second starting location on the circle, wherein the first unique route comprises a first image at the first starting location on the circle, an inner image at an inner location inside the circle, and a destination image at the destination location, and wherein the second unique route comprises a second image at the second starting location on the circle, the inner image at the inner location inside the circle, and the destination image at the destination location.

* * * * *